E. J. OPPELT.
APPARATUS FOR COLORING TOBACCO-LEAVES.

No. 195,386.  Patented Sept. 18, 1877.

Witnesses:
Inventor:
Edmund J. Oppelt
Per: C. H. Watson & Co. Attorneys.

UNITED STATES PATENT OFFICE.

EDMUND J. OPPELT, OF BALTIMORE, MARYLAND.

IMPROVEMENT IN APPARATUS FOR COLORING TOBACCO-LEAVES.

Specification forming part of Letters Patent No. 195,386, dated September 18, 1877; application filed July 28, 1876.

*To all whom it may concern:*

Be it known that I, EDMUND J. OPPELT, of Baltimore, in the county of Baltimore and State of Maryland, have invented certain new and useful Improvements in Coloring Tobacco-Leaves; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My present invention is intended as an improvement upon the device for coloring tobacco-leaves for which Letters Patent No. 152,004 were granted to me June 16, 1874; and the nature of my invention consists in the combination of parts, all as hereinafter more fully set forth.

Figure 1:
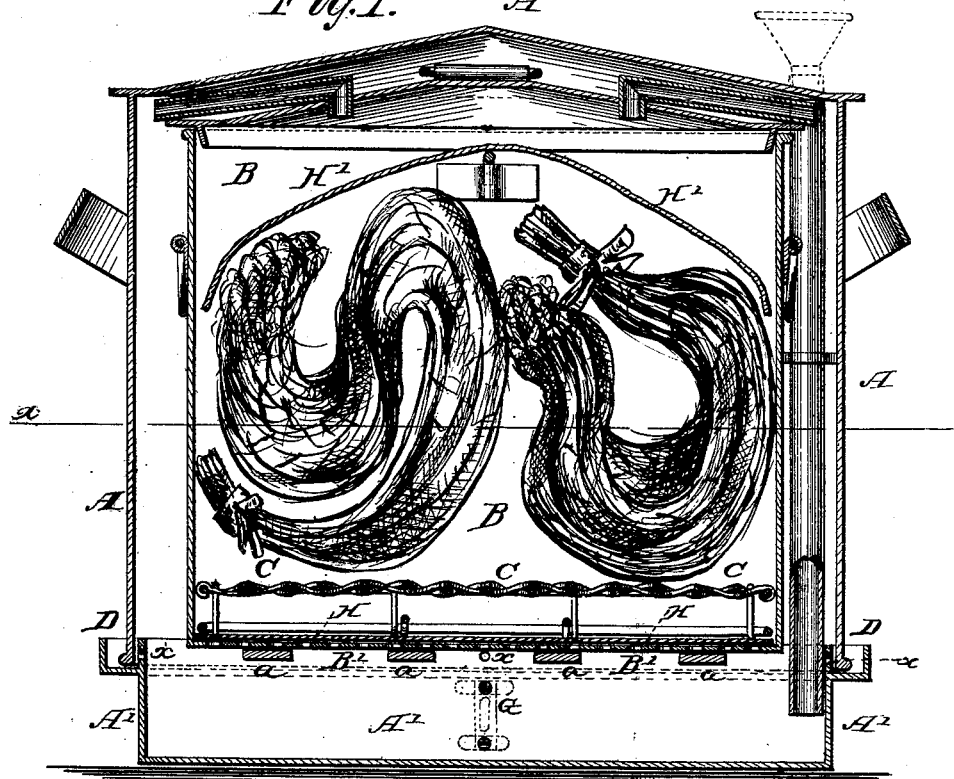
Figure 2:
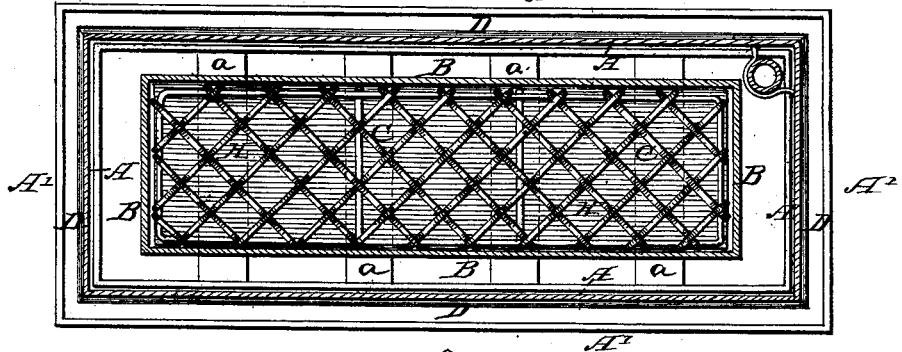
Figure 3:
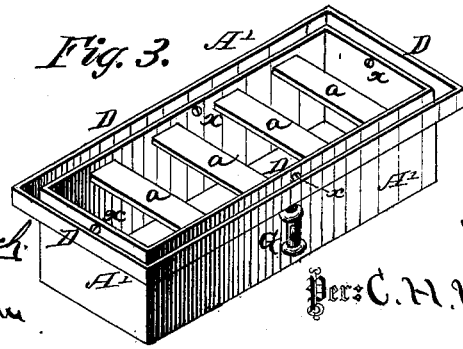

In the annexed drawings, Figure 1 is a central vertical section. Fig. 2 is a transverse section on line $x\,x$, Fig. 1. Fig. 3 is a detail perspective view of the steam-tub A'.

B represents the interior vessel or tobacco-chamber, with perforated bottom B', a layer, H, of cloth, wire frame C, and top cloth H', all precisely the same as described in my former patent above referred to. A is the outer vessel or steam-box; and A' is the steam-tub, at the bottom thereof. In the steam-tub are suitable cross-bars $a\,a$, upon which the inner vessel or tobacco-chamber B rests.

In my former patent the steam-tub A' was formed a part of the outer steam-box A, and the inner vessel B had to be lifted out and in, which was not only difficult and laborious, but also in some cases apt to cause injury to the tobacco.

In the present case I construct the steam-tub and outer vessel separate, the outer vessel being permanently closed at the top and open at the bottom, and place the outer vessel A over the inner vessel on top of the steam-tub, obviating the necessity of lifting the inner vessel B when full of tobacco. The outer vessel A can easily be removed and put in place again.

Around the upper edges of the steam-tub A' is formed a grooved seat, D, in which the bottom edges of the outer vessel A are placed. As the steam condenses the water runs down the sides of the outer vessel and fills the grooved seat, thus forming a perfect water-seal for the outer vessel.

To prevent overflow from the seal, apertures $x$ are made, to conduct the surplus water from the same into the steam-tub. I also provide the steam-tub, on one side, with a water-gage, G, as shown.

Having thus fully described my invention, what I claim as new, and desire to secure by Letters Patent, is—

1. The removable inside box B, with a cover and perforated bottom, in combination with a removable box, A, and tub A', substantially as and for the purpose set forth.

2. The inside box, provided with a cover and perforated bottom, in combination with a tub, A', and a water-sealed box A, substantially as and for the purpose set forth.

3. The combination of the steam-tub A', having the grooved seat D around its upper edge, the removable outer vessel A, and the interior steam box or vessel B, all constructed substantially as and for the purposes herein set forth.

In testimony that I claim the foregoing as my own I affix my signature in presence of two witnesses.

EDMUND J. OPPELT.

Witnesses:
WM. B. UPPERMAN,
C. H. WATSON.